W. D. AMENT.
Wheel Cultivator.

No. 45,807. Patented Jan. 10, 1865.

WITNESSES:

INVENTOR:

UNITED STATES PATENT OFFICE.

W. D. AMENT, OF MUSCATINE, IOWA.

IMPROVED CULTIVATOR.

Specification forming part of Letters Patent No. 45,807, dated January 10, 1865.

*To all whom it may concern:*

Be it known that I, W. D. AMENT, of Muscatine, in the county of Muscatine and State of Iowa, have invented a new and Improved Cultivator; and I do hereby declare that the following is a full, clear, and exact description thereof, which will enable others skilled in the art to make and use the same, reference being had to the accompanying drawings, making part of this specification, in which—

Figure 1:
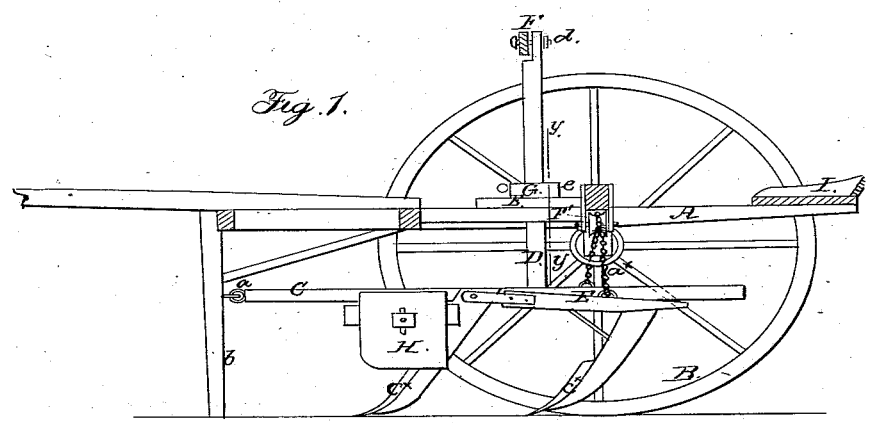
Figure 2:
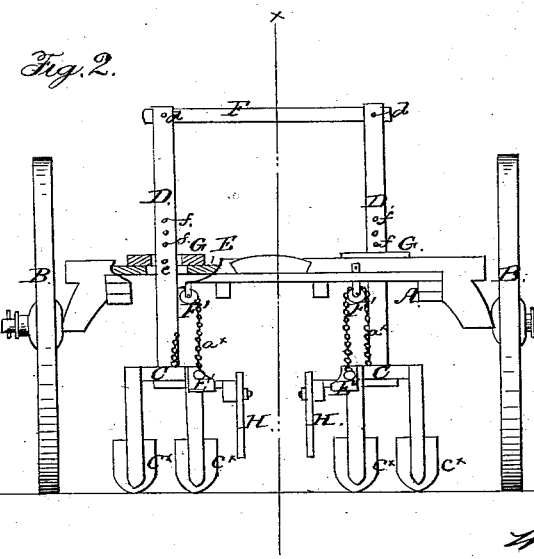

Figure 1 is a side sectional view of my invention, taken in the line $x\ x$, Fig. 2; Fig. 2, a back view of the same, partly in section, as indicated by the line $y\ y$, Fig. 1.

Similar letters of reference indicate like parts.

This invention relates to a new and improved cultivator of that class in which the shovels or shares are rendered adjustable in a lateral and a vertical direction.

The invention consists in having the shovel or plow beams attached at their front ends to the front part of the framing by means of joints, and having uprights attached to the beams, which pass through openings in plates on the framing, on which uprights adjustable blocks are fitted which hold the beams and the shovels and plows in a suspended state, and gage the depth of the penetration of the same in the earth, as may be desired, the plow-beams having treadles connected to them with chains attached which pass over pulleys, and all arranged in such a manner as to admit of the shovels and plows being operated with the greatest facility.

A represents a rectangular frame, which is mounted on two wheels, B B.

C C are two shovel or plow beams, the front ends of which are attached by universal joints $a\ a$ to pendants $b\ b$ at the front part of the frame A.

To each beam C there is attached an upright, D, which passes up through openings $c$, in plates E on the framing. These uprights are connected at their upper ends by pivots $d$ to a cross-bar, F. On each upright D there is fitted loosely a block, G, and these blocks are secured on the uprights by pins $e$, which pass through any of a series of holes, $f$, in the uprights D. By adjusting these blocks G higher or lower on the uprights D the shovels or plows $C^\times$ may be made to penetrate the earth to a greater or less depth, as may be desired. Each beam C has a treadle, E', attached to it, and to each treadle there is secured a chain, $a^\times$, said chains passing over pulleys F' at the under side of the frame A, and extending down to the beams C, to which they are attached.

Each beam C may have two or more shovels attached to them, and also guards H, by which the earth is prevented from being thrown or cast upon the plants.

The driver's seat I is placed on the back part of the frame A, and the driver with his feet on the treadles E' E' may raise or lower the shovels or plows, and also move them laterally, as may be desired. Thus by this simple arrangement the shovels or plows are placed under the complete control of the driver, and the plants may be cultivated or have the earth plowed as close to them as may be necessary without the liability of having the plants plowed out or injured in any way, and the plows made to enter the earth at a greater or less depth, as may be desired.

I claim as new and desire to secure by Letters Patent—

In combination with the standards D D, adapted to be operated by treadles so as to move the plows vertically and laterally, the adjustable blocks G, resting upon the plates E, and employed to vary or regulate the depth to which the plows penetrate the ground, in the manner herein explained.

W. D. AMENT.

Witnesses:
J. B. GREELEY,
F. D. JOHNSON.